(12) United States Patent
Ueno et al.

(10) Patent No.: US 12,240,387 B2
(45) Date of Patent: Mar. 4, 2025

(54) VEHICLE WIRING SYSTEM, OPTICAL COUPLER, AND METHOD OF CONSTRUCTING VEHICLE WIRING SYSTEM

(71) Applicant: Sumitomo Electric Industries, Ltd., Osaka (JP)

(72) Inventors: Yuto Ueno, Osaka (JP); Susumu Takeshima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 253 days.

(21) Appl. No.: 17/913,163

(22) PCT Filed: Mar. 18, 2021

(86) PCT No.: PCT/JP2021/010966
§ 371 (c)(1),
(2) Date: Sep. 21, 2022

(87) PCT Pub. No.: WO2021/220654
PCT Pub. Date: Nov. 4, 2021

(65) Prior Publication Data
US 2023/0145552 A1   May 11, 2023

(30) Foreign Application Priority Data
Apr. 27, 2020   (JP) .................. 2020-078326

(51) Int. Cl.
*B60R 16/02*   (2006.01)
*F21V 8/00*   (2006.01)
(Continued)

(52) U.S. Cl.
CPC ........ *B60R 16/0207* (2013.01); *G02B 6/0005* (2013.01); *H01B 11/22* (2013.01); *B60Q 1/0088* (2013.01); *B60R 1/12* (2013.01)

(58) Field of Classification Search
CPC ... B60R 16/02; B60R 16/0207; G02B 6/0006; H04B 10/272
See application file for complete search history.

(56) References Cited

U.S. PATENT DOCUMENTS

| 5,809,187 A | 9/1998 | Peck, Jr. et al. |
| 7,643,756 B2 | 1/2010 | Aizpuru |

(Continued)

FOREIGN PATENT DOCUMENTS

| JP | 3-98168 U | 10/1991 |
| JP | 5-64005 U | 8/1993 |

(Continued)

OTHER PUBLICATIONS

International Search Report and Written Opinion mailed on Jun. 1, 2021, received for PCT Application PCT/JP2021/010966, filed on Mar. 18, 2021, 9 pages with English Translation.

(Continued)

*Primary Examiner* — Omar R Rojas
(74) *Attorney, Agent, or Firm* — XSENSUS LLP

(57) ABSTRACT

A vehicle wiring system includes a plurality of functional units to be mounted in a vehicle, an optical transmission line that is wired between the functional units and configured to transmit an optical signal of the functional units, an electric wire harness that is provided, in a partial section of the optical transmission line, together with the optical transmission line in a state of being integrated with the optical transmission line, and an optical coupler that is disposed in a portion of the optical transmission line other than the section and constitutes a part of the optical transmission line.

13 Claims, 5 Drawing Sheets

(51) Int. Cl.
*H01B 11/22* (2006.01)
*B60Q 1/00* (2006.01)
*B60R 1/12* (2006.01)

(56) References Cited

U.S. PATENT DOCUMENTS

| | | |
|---|---|---|
| 11,199,703 B2 | 12/2021 | Fu et al. |
| 2005/0065683 A1 | 3/2005 | Remillard et al. |
| 2007/0267212 A1* | 11/2007 | Nachbauer ............. H01R 29/00 174/70 R |
| 2008/0267564 A1* | 10/2008 | Han ................... G02B 6/12004 385/45 |
| 2012/0189302 A1 | 7/2012 | Yuki et al. |
| 2015/0219975 A1* | 8/2015 | Phillips ..................... E06B 9/24 359/275 |
| 2020/0374007 A1 | 11/2020 | Tanaka et al. |
| 2022/0013983 A1 | 1/2022 | Parekh et al. |
| 2023/0175662 A1 | 6/2023 | Ueno et al. |

FOREIGN PATENT DOCUMENTS

| | | |
|---|---|---|
| JP | 6-137875 A | 5/1994 |
| JP | 11-227546 A | 8/1999 |
| JP | 2007-052340 A | 3/2007 |
| JP | 2008-219366 A | 9/2008 |
| JP | 2011-233953 A | 11/2011 |
| WO | 2019/111447 A1 | 6/2019 |

OTHER PUBLICATIONS

International Search Report and Written Opinion mailed on Jun. 1, 2021, received for PCT Application PCT/JP2021/010978, filed on Mar. 18, 2021, 8 pages including English Translation.

Office Action issued on Jan. 24, 2024, in corresponding co-pending U.S. Appl. No. 17/911,672, 37 pages.

Notice of Allowance issued on Apr. 11, 2024, in corresponding U.S. Appl. No. 17/911,672, 26 pages.

Notice of Allowance issued on Aug. 8, 2024, in corresponding U.S. Appl. No. 17/911,672, 16 pages.

* cited by examiner

VEHICLE WIRING SYSTEM, OPTICAL COUPLER, AND METHOD OF CONSTRUCTING VEHICLE WIRING SYSTEM

CROSS-REFERENCE TO RELATED APPLICATIONS

The present application is based on PCT/JP2021/010966 filed on Mar. 18, 2021, which claims priority to JP 2020-078326, filed on Apr. 27, 2020, the entire contents of each are incorporated herein by reference.

TECHNICAL FIELD

The present disclosure relates to a vehicle wiring system, an optical coupler, and a method of constructing a vehicle wiring system.

BACKGROUND ART

Patent Literature (PTL 1) discloses a vehicle wiring system as follows. That is, the vehicle wiring system is a vehicle wiring system mounted in a vehicle, and includes a master functional unit and a plurality of slave functional units. The plurality of slave functional units is configured to transmit an uplink communication signal to the master functional unit via at least a common optical fiber.

CITATION LIST

Patent Literature

PTL 1: International Patent Publication No. WO2019/111447

SUMMARY OF INVENTION

A vehicle wiring system according to the present disclosure includes a plurality of functional units to be mounted in a vehicle, an optical transmission line that is wired between the functional units and configured to transmit an optical signal of the functional units, an electric wire harness that is provided, in a partial section of the optical transmission line, together with the optical transmission line in a state of being integrated with the optical transmission line, and an optical coupler that is disposed in a portion of the optical transmission line other than the section and constitutes a part of the optical transmission line.

DESCRIPTION OF EMBODIMENTS

Figure 1:
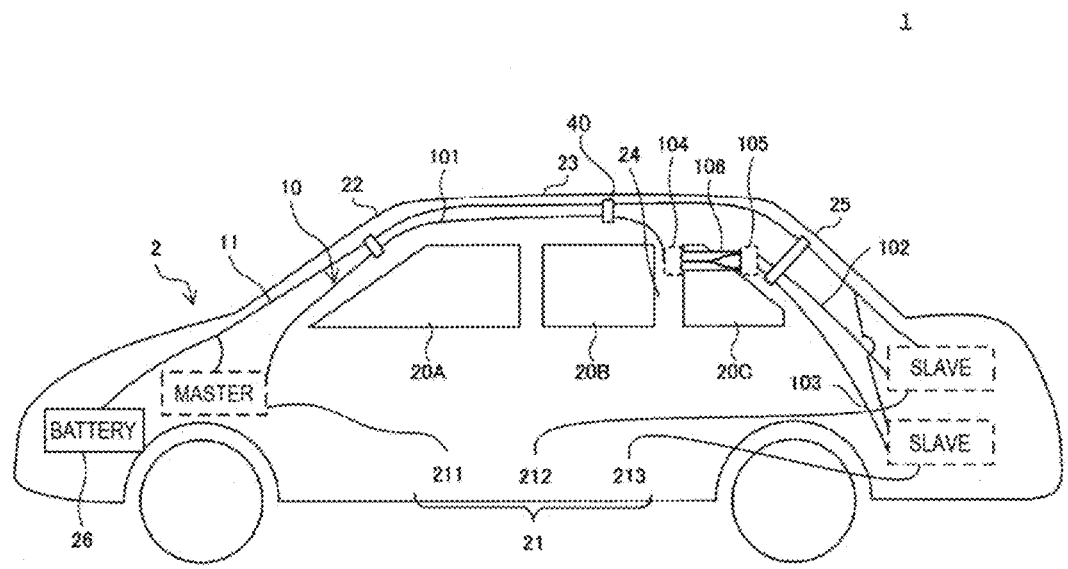
FIG. 1 is a diagram illustrating an example of a configuration of a vehicle wiring system according to a first embodiment of the present disclosure.

Conventionally, in order to cope with increasing data communication traffic in a vehicle, a technique using an optical fiber in a vehicle wiring system has been proposed.
[Problems to be Solved by Present Disclosure]

When an optical coupler is used in a vehicle wiring system, it is desirable to have a technique that can suppress breakage of the optical coupler.

The present disclosure has been made to solve the above-described problem, and an object of the present disclosure is to provide a vehicle wiring system, an optical coupler, and a method of constructing a vehicle wiring system that can suppress the breakage of the optical coupler in an in-vehicle network using the optical coupler.
[Advantageous Effects of Present Disclosure]

According to the present disclosure, it is possible to suppress breakage of an optical coupler in an in-vehicle network using the optical coupler.

The present disclosure may be realized as a semiconductor integrated circuit that builds a part or all of a vehicle wiring system.
[Description of Embodiments of Present Disclosure]

First, the contents of embodiments according to the present disclosure will be listed and described.

(1) A vehicle wiring system according to an embodiment of the present disclosure includes a plurality of functional units to be mounted in a vehicle, an optical transmission line that is wired between the functional units and configured to transmit an optical signal of the functional units, an electric wire harness that is provided, in a partial section of the optical transmission line, together with the optical transmission line in a state of being integrated with the optical transmission line, and an optical coupler that is disposed in a portion of the optical transmission line other than the section and constitutes a part of the optical transmission line.

In General, in wiring processing in a vehicle, an electric wire harness, an optical transmission line, and the like are provided together, and these are bundled. However, since a material of the optical coupler used in the optical transmission line is soft, when the optical coupler is assembled to the electric wire harness, an external force such as bending or twisting is applied to the optical coupler, and the optical coupler is easily broken. On the other hand, a configuration in which the optical coupler is disposed in the portion of the optical transmission line other than the section where the electric wire harness and the optical transmission line are provided together eliminates a need to assemble the optical coupler to the electric wire harness. Therefore, it is possible to suppress breakage of the optical coupler in the in-vehicle network using the optical coupler.

(2) The vehicle wiring system may include window glass to be mounted in the vehicle. The optical coupler may be disposed on or in the window glass.

When the optical coupler is disposed on or in the window glass of the vehicle, the optical coupler does not need to be assembled to the electric wire harness. Further, disposing the optical coupler on or in the window glass of the vehicle eliminates a need to separately provide a space for disposing the optical coupler, and thus the vehicle wiring system can be space-saving.

(3) A window glass may be constituted by laminated glass having a plurality of layers. The optical coupler may be disposed between the layers.

This configuration prevents an occupant or an objects from touching the optical coupler, thereby preventing damage to the optical coupler due to contact.

(4) The optical coupler may be disposed along an outer periphery of the window glass.

This configuration allows the optical coupler to be disposed along a window frame of the vehicle, thereby shortening wiring sections of optical fiber cables connected to both ends of the optical coupler.

(5) The vehicle wiring system may include a mirror to be mounted in the vehicle. The optical coupler may be disposed on the mirror.

Disposing the optical coupler on the mirror of the vehicle eliminates a need to separately provide a space for disposing the optical coupler, and thus the vehicle wiring system can be space-saving.

(6) The vehicle wiring system may include an interior lighting device to be mounted in the vehicle. The optical coupler may be disposed on the lighting device.

Disposing the optical coupler on the lighting device in the vehicle eliminates a need to separately provide a space for disposing the optical coupler. Therefore, disposing the optical coupler on the lighting device in the vehicle allows the vehicle wiring system to be space-saving.

(7) The lighting device may be configured to be capable of being disposed in a cockpit of the vehicle. The optical coupler may be disposed on a cover of the lighting device.

Disposing the optical coupler on the lighting device in the cockpit of the vehicle allows the vehicle wiring system to be space-saving more efficiently.

(8) The vehicle wiring system may include a roof panel and a roof lining to be mounted in the vehicle. The optical coupler may be disposed between the roof panel and the roof lining.

When a thick object such as an electric wire harness is disposed between the roof panel and the roof lining of the vehicle, a degree of freedom in roof design of the vehicle is reduced. On the other hand, since the optical coupler is thin, even when the optical coupler is disposed between the roof panel and the roof lining, it is possible to effectively utilize a space where the electric wire harness is not disposed while maintaining the degree of freedom in the roof design.

(9) An optical coupler according to an embodiment of the present disclosure is configured to relay an optical signal between functional units to be mounted in a vehicle. The optical coupler includes a transparent body portion and an optical waveguide formed in the body portion and branching in the body portion.

With this configuration, even when the optical coupler is disposed on or in, for example, a window or a mirror of a vehicle, since the body portion is transparent, a good field of view can be ensured. In addition, even when the optical coupler is disposed on, for example, a lighting device in a vehicle, the amount of light or the like is less likely to decrease.

(10) A method of constructing a vehicle wiring system according to an embodiment of the present disclosure includes preparing a plurality of functional units to be mounted in a vehicle, an optical transmission line, an electric wire harness, and an optical coupler; wiring the optical transmission line between the functional units so as to transmit an optical signal of the functional units; wiring the electric wire harness in a partial section of the optical transmission line so that the electric wire harness is provided together with the optical transmission line in a state of being integrated with the optical transmission line; and disposing the optical coupler in a portion of the optical transmission line other than the section and causing the optical coupler to constitute a part of the optical transmission line.

Disposing the optical coupler in the portion of the optical transmission line other than the section in which the optical transmission line is provided together with the electric wire harness eliminates a need to assemble the optical coupler to the electric wire harness. Therefore, it is possible to suppress breakage of the optical coupler in the in-vehicle network using the optical coupler.

Hereinafter, embodiments of the present disclosure will be described with reference to the drawings. In the drawings, the same or corresponding portions are denoted by the same reference numerals, and description thereof will not be repeated. Further, at least parts of the embodiments described below may be arbitrarily combined.

First Embodiment

FIG. 1 is a diagram illustrating an example of a configuration of a vehicle wiring system according to a first embodiment of the present disclosure.

Referring to FIG. 1, a vehicle wiring system 1 is mounted in a vehicle 2. Vehicle 2 is, for example, a four-wheeled automobile, and includes a window 20A for a first row of seats, a window 20B for a second row of seats, and a window 20C for a third row of seats or for a luggage compartment, on a side surface as structural members of vehicle 2 itself. Windows 20A and 20B can be opened and closed, and window 20C is a fixed window that cannot be opened and closed. Window 20C is disposed between a C-pillar 24 and a D-pillar 25 of vehicle 2. Glass (window glass) used for windows 20A to 20C is transparent. The term "transparent" as used herein means that a total light transmittance defined in JIS K 7361-1 (1997) is 90% or more. The structural members are members serving as structural bodies that support the vehicle, and are members that constitute parts of vehicle 2 and are at least partially transparent. Hereinafter, the "window glass" is also simply referred to as a "window".

Vehicle wiring system 1 includes an optical transmission line 10 and an electric wire harness 11.

[Optical Transmission Line]

In an example shown in FIG. 1, vehicle 2 includes a master functional unit 211 and slave functional units 212 and 213 as functional units 21. Master functional unit 211 is mounted in an engine room of vehicle 2. Slave functional units 212 and 213 are mounted in a trunk of vehicle 2. The master functional unit may be also referred to as a "leader functional unit", and the slave functional units may be also referred to as "follower functional units". Optical transmission line 10 is wired between master functional unit 211 and slave functional units 212 and 213, and transmits an optical signal between master functional unit 211 and slave functional units 212 and 213.

Master functional unit 211 and slave functional units 212 and 213 may be an ECU, a camera, a sensor, or an antenna module. The ECU includes an automatic driving electronic control unit (ECU), a navigation device, a telematics control unit (TCU), a gateway device, and the like. The sensor includes a millimeter-wave sensor, a light detection and ranging (LiDAR), and the like.

Optical transmission line 10 connects master functional unit 211 to slave functional units 212 and 213 so as to enable optical communication with each other. In the example shown in FIG. 1, an optical communication system is constructed in optical transmission line 10. The optical communication system may be, for example, a PON (Passive Optical Network) system. The optical communication system may be a system other than the PON system.

Optical transmission line 10 includes optical fiber cables 101, 102 and 103, optical connectors 104 and 105, and an optical coupler 106.

Optical fiber cable 101 extends rearward from master functional unit 211 along an A-pillar 22 and a roof side rail 23 of vehicle 2. Optical fiber cable 101 is connected to optical connector 104 fixed to a vehicle interior side of C-pillar 24. Optical fiber cable 102 extends forward from slave functional unit 212 along D-pillar 25 of vehicle 2. Optical fiber cable 102 is connected to optical connector 105 fixed to a vehicle interior side of D-pillar 25. Similarly, optical fiber cable 103 extends forward from slave functional unit 213 along D-pillar 25 of vehicle 2. Optical fiber cable 103 is connected to optical connector 105.

Optical connectors 104 and 105 are fixed to pillars 24 and 25, respectively, with screwing, a glue or a pressure-sensitive adhesive, for example. Optical connectors 104 and 105 relay an optical signal between master functional unit 211 and slave functional units 212 and 213.

Optical coupler 106 is disposed between optical connectors 104 and 105, and connected to both of them. That is, optical coupler 106 is disposed in a partial section of optical transmission line 10. Optical coupler 106 is disposed on a vehicle interior side of window 20C of vehicle 2. Optical coupler 106 is fixed to window 20C with, for example, a glue or a pressure-sensitive adhesive. Optical coupler 106 is disposed in a front-rear direction of vehicle 2 so as to connect C-pillar 24 and D-pillar 25 to each other.

[Details of Optical Fiber Cable, Optical Connector, and Optical Coupler]

Hereinafter, optical fiber cables 101, 102 and 103, optical connectors 104 and 105, and optical coupler 106 will be described in more detail.

Figure 2:
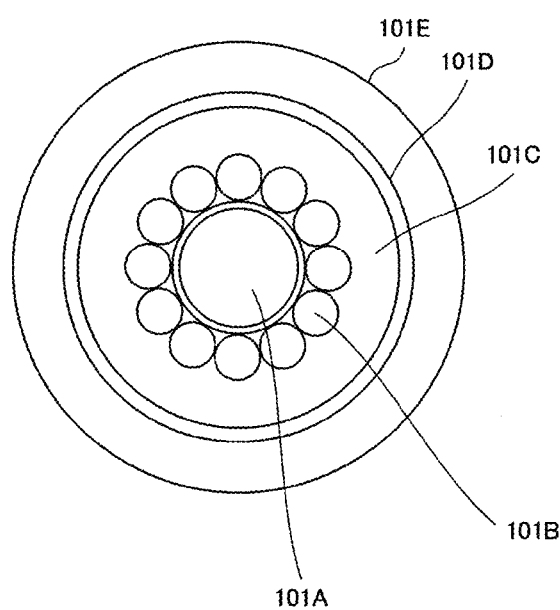
FIG. 2 is a cross-sectional view illustrating an example of a configuration of an optical fiber cable in the vehicle wiring system according to the first embodiment of the present disclosure.

FIG. 2 is a cross-sectional view illustrating an example of a configuration of an optical fiber cable in the vehicle wiring system according to the first embodiment of the present disclosure. In FIG. 2, a cross-section of optical fiber cable 101 is shown. Optical fiber cables 102 and 103 have the same configuration as that of optical fiber cable 101.

Referring to FIG. 2, optical fiber cable 101 includes a tension member 101A, a plurality of optical fibers 101B, a protective layer 101C, a wrapping tape 101D, and a sheath 101E.

The plurality of optical fibers 101B is disposed around tension member 101A. Optical fibers 101B are, for example, optical fiber core wires. Optical fiber cable 101 includes one or more optical fibers 101B. The number of optical fibers 101B in optical fiber cable 101 is not limited. Optical fiber cable 101 is not limited to a configuration in which optical fibers 101B which are optical fiber core wires are accommodated, and may be, for example, a 0.25 mm strand, a 0.9 mm core wire, a tape core wire, or the like.

Protective layer 101C covers the plurality of optical fibers 101B. Wrapping tape 101D covers protective layer 101C. Sheath 101E covers wrapping tape 101D.

Figure 3:
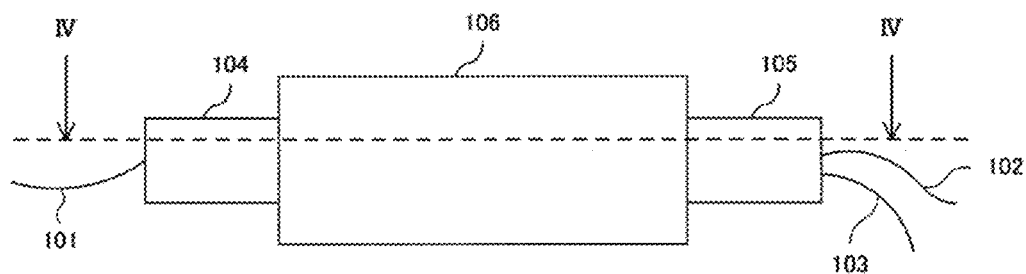
FIG. 3 is a front view illustrating examples of optical connectors and an optical coupler according to the first embodiment of the present disclosure.

FIG. 3 is a front view illustrating examples of the optical connectors and the optical coupler according to the first embodiment of the present disclosure.

Referring to FIG. 3, optical connector 104 can connect the optical fibers in optical fiber cable 101. Optical connector 105 can connect the optical fibers in optical fiber cables 102 and 103.

Figure 4:
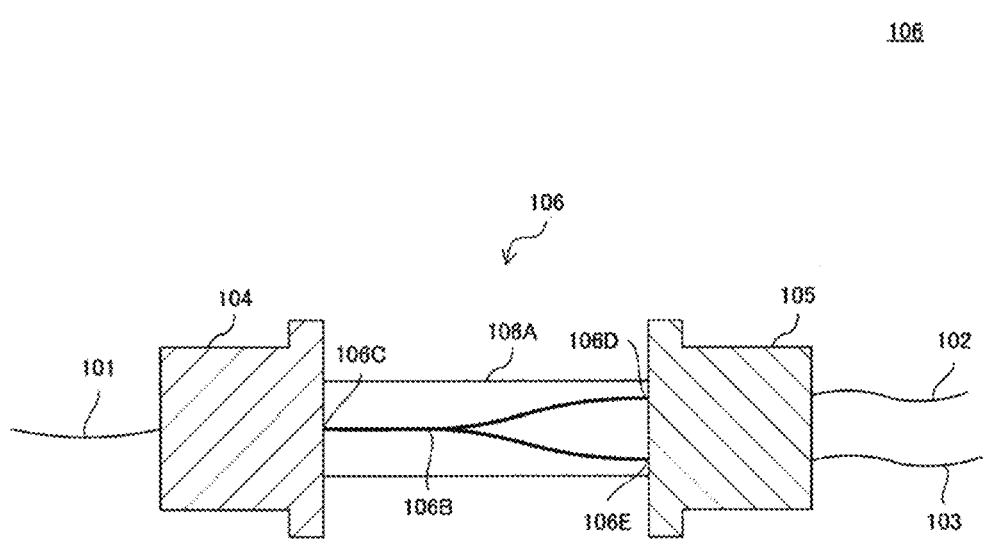
FIG. 4 is a cross-sectional view taken along line IV-IV in FIG. 3.

FIG. 4 is a cross-sectional view taken along line IV-IV in FIG. 3.

Referring to FIG. 4, optical coupler 106 includes a body portion 106A and an optical waveguide 106B branching in body portion 106A. Optical connectors 104 and 105 are connected to both ends of optical coupler 106.

Body portion 106A has, for example, a rectangular film shape in a plan view. Body portion 106A is formed of a resin. Optical coupler 106 formed of a resin is compact and flexible. A thickness of body portion 106A is, for example, 1 mm or less.

Body portion 106A is transparent. The term "transparent" as used herein means that a total light transmittance defined in JIS K 7361-1 (1997) is 90% or more.

Optical waveguide 106B is formed in body portion 106A so as to extend between optical connector 104 and optical connector 105. Optical waveguide 106B has a branching portion. Optical waveguide 106B includes, for example, a first end 106C connected to optical connector 104, a second end 106D connected to optical connector 105, and a third end 106E connected to optical connector 105. Optical waveguide 106B is formed in body portion 106A by a photolithography technique or the like.

Optical connector 104 receives an optical signal from optical fiber cable 101. The optical signal received by optical connector 104 from optical fiber cable 101 is output to optical fiber cables 102 and 103 via optical waveguide 106B in optical coupler 106 and optical connector 105. That is, the optical signal received by optical connector 104 from optical fiber cable 101 is branched by optical coupler 106 and output to optical fiber cables 102 and 103.

Optical connector 105 receives optical signals from optical fiber cables 102 and 103. The optical signal received by optical connector 105 from optical fiber cable 102 is output to optical fiber cable 101 via optical waveguide 106B in optical coupler 106 and optical connector 104. Further, the optical signal received by optical connector 105 from optical fiber cable 103 is output to optical fiber cable 101 via optical waveguide 106B in optical coupler 106 and optical connector 104. That is, the optical signals received by optical connector 105 from optical fiber cables 102 and 103 are combined by optical coupler 106 and output to optical fiber cable 101.

[Electric Wire Harness]

Referring to FIG. 1, electric wire harness 11 includes a cable, a terminal, a connector, and the like. Electric wire harness 11 extends rearward from a battery 26 along A-pillar 22, roof side rail 23, and D-pillar 25 in vehicle 2. Electric wire harness 11 connects master functional unit 211 and slave functional units 212 and 213 to battery 26. Electric power supplied from battery 26 is supplied to master functional unit 211 and slave functional units 212 and 213 via electric wire harness 11.

Since electric wire harness 11 includes a plurality of bundled cables, electric wire harness 11 is thicker than optical transmission line 10, and is, for example, 20 mm to 100 mm in thickness. Electric wire harness 11 may be used for transmitting and receiving an electric signal in addition to supplying electric power. Electric wire harness 11 is used for at least one of supplying electric power or transmitting and receiving the electric signal.

Electric wire harness 11 is provided together with optical fiber cable 101 in a partial section between master functional unit 211 and optical connector 104. Electric wire harness 11 is provided together with optical fiber cables 102 and 103 in a section from slave functional units 212 and 213 to optical connector 105. In these sections, electric wire harness 11 is bundled with, for example, optical fiber cables 101, 102 and 103 by a cable tie 40. That is, in these sections, electric wire harness 11 is provided together with optical fiber cables 101, 102 and 103 in a state of being integrated with optical fiber cables 101, 102 and 103 by cable tie 40.

On the other hand, electric wire harness 11 is not provided together with optical coupler 106 in a state of being integrated with optical coupler 106. That is, electric wire harness 11 includes a section where electric wire harness 11 is provided together with optical transmission line 10 in a state of being integrated with optical transmission line 10 in a portion of optical transmission line 10 other than a section in which optical coupler 106 is disposed. Here, the phrase "provided together in a state being integrated" includes a state in which electric wire harness 11 and optical transmission line 10 are integrated with each other by one tying member 40 and a state in which electric wire harness 11 and optical transmission line 10 are fixed by one fixing member 40.

More specifically, electric wire harness 11 extends from master functional unit 211 toward a rear of vehicle 2 in a state of being bundled with optical fiber cable 101 and is separated from optical fiber cable 101 just before optical connector 104.

After separating from optical fiber cable 101, electric wire harness 11 extends to a rear end of roof side rail 23 and is directed toward slave functional units 212 and 213 along D-pillar 25. Electric wire harness 11 is merged and bundled with optical fiber cables 102 and 103 in D-pillar 25.

[Communication Operation Using Vehicle Wiring System]

Next, a communication method using vehicle wiring system 1 will be described. Hereinafter, optical communication using optical transmission line 10 will be described, and electric communication using electric wire harness 11 will not be described in detail since it is well-known.

Hereinafter, a direction from slave functional units 212 and 213 to master functional unit 211 is referred to as an uplink direction, and a direction from master functional unit 211 to slave functional units 212 and 213 is referred to as a downlink direction. The optical communication system using optical transmission line 10 is, for example, a TDM-PON system. Specifically, time division multiple access (TDMA) is used in the uplink direction, and time division multiplexing (TDM) is used in the downlink direction.

Each of slave functional units 212 and 213 can transmit an upstream optical signal including a upstream communication signal such as a frame to master functional unit 211 via a corresponding one of optical fiber cables 102 and 103, optical coupler 106, optical connectors 105 and 104, and optical fiber cable 101. In addition, master functional unit 211 can transmit a downstream optical signal including a downstream communication signal such as a frame to a corresponding one of slave functional units 212 and 213 via optical fiber cable 101, optical coupler 106, optical connectors 104 and 105, and the respective optical fiber cables 102 and 103.

Each of master functional unit 211 and slave functional units 212 and 213 includes an optical transceiver (not shown). The optical transceiver in master functional unit 211 is connected to optical fiber cable 101. The optical transceiver receives, for example, an upstream optical signal in a 1280 nm band from optical fiber cable 101, and converts the received upstream optical signal into an electric signal to output the electric signal to a processing unit (not shown). The optical transceiver in master functional unit 211 receives an electric signal from the processing unit (not shown), and converts the received electric signal into a downstream optical signal in a different wavelength band, for example, a 1570 nm band to output the downstream optical signal to optical fiber cable 101.

The optical transceiver in slave functional unit 212 is connected to optical fiber cable 102. The optical transceiver in slave functional unit 213 is connected to optical fiber cable 103. Each of the optical transceivers receives a downstream optical signal in the 1570 nm band from optical fiber cables 102 and 103, and converts the received downstream optical signal into an electric signal to output the electric signal to the processing unit (not shown). The optical transceivers in slave functional units 212 and 213 receive electric signals from the processing unit, and convert the received electric signals into uplink optical signals, for example, in the 1280 nm band to output the uplink optical signals to the respective optical fiber cables 102 and 103.

In the optical communication using vehicle wiring system 1, not only the TDMA but also wavelength division multiplexing (WDM) suitable for communication with a larger amount of data may be used in the uplink direction. In this case, the plurality of slave functional units 212 and 213 transmits uplink optical signals having different wavelengths from each other.

Further, in the optical communication using vehicle wiring system 1, not only the TDM but also the WDM suitable for communication with a larger amount of data may be used in the downlink direction. In this case, master functional unit 211 transmits downstream optical signals having different wavelengths to the respective slave functional units 212 and 213.

In the optical communication using vehicle wiring system 1, not only the TDMA but also code division multiplexing (CDM) suitable for communication with a larger amount of data may be used in the uplink direction. In this case, the plurality of slave functional units 212 and 213 transmits uplink optical signals including communication signals spread by different spreading codes from each other.

Further, in the optical communication using vehicle wiring system 1, not only the TDM but also the CDM suitable for communication with a larger amount of data may be used in the downlink direction. In this case, master functional unit 211 transmits downstream optical signals including communication signals spread by different spreading codes from each other to the respective slave functional units 212 and 213.

In addition, in the optical communication using vehicle wiring system 1, frequency division multiplexing (FDM), space division multiplexing (SDM), time and wavelength division multiplexing (TWDM), or the like which is suitable for communication with a larger amount of data may be used.

When an optical coupler is used in a vehicle wiring system, it is desired to suppress breakage of the optical coupler.

Electric wire harness 11 is disposed inside a vehicle to transmit electricity to functional unit 21. When optical transmission line 10 is wired from master functional unit 211 to slave functional units 212 and 213 in the vehicle, it is usually necessary to assemble optical transmission line 10 to electric wire harness 11. However, since optical coupler 106 in optical transmission line 10 is formed of a soft material, it is easily broken during assembly.

On the other hand, in vehicle wiring system 1 according to the first embodiment, optical coupler 106 is not assembled to electric wire harness 11, but is disposed on window 20C of vehicle 2. Therefore, even when optical coupler 106 is used in vehicle wiring system 1, it is possible to suppress breakage of optical coupler 106. Since the electric wire harness has a certain thickness, it is difficult to wire the electric wire harness on the window of the vehicle.

When electric wire harness 11 is wired along A-pillar 22, roof side rail 23, and D-pillar 25 in vehicle 2 as in vehicle wiring system 1 according to the first embodiment, optical coupler 106 may be disposed above ½ of a height of window 20C in order to facilitate the wiring. Further, optical coupler 106 may be disposed above ¼ of the height of window 20C.

(Modification 1)

Figure 5:
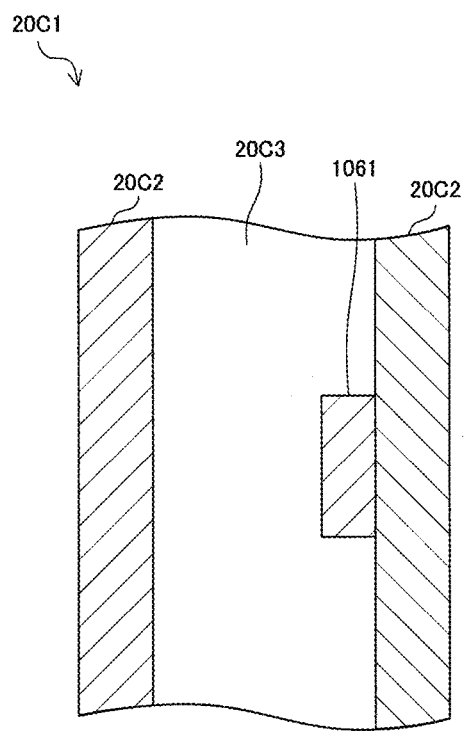
FIG. 5 is a cross-sectional view of an optical coupler and a window of a vehicle according to a first modification of the first embodiment of the present disclosure.

FIG. 5 is a cross-sectional view of an optical coupler and a window of a vehicle according to a first modification of the first embodiment of the present disclosure. FIG. 5 shows a cross section perpendicular to a front-rear direction of vehicle 2.

Referring to FIG. 5, a window 20C1 is constituted by laminated glass having a plurality of layers. Specifically, window 20C1 includes two sheet glasses 20C2 and an interlayer 20C3. Two sheet glasses 20C2 are disposed at an interval. Interlayer 20C3 is formed between two sheet glasses 20C2. Interlayer 20C3 may be filled with air, argon gas, or the like, or may be in vacuum, and is not particularly limited.

Optical coupler 106 is disposed between the layers of the laminated glass. Specifically, optical coupler 106 is disposed in interlayer 20C3, and is fixed to one of two sheet glasses 20C2 with a glue, a pressure-sensitive adhesive, or the like.

With this configuration, optical coupler 106 is disposed inside window 20C1, so that even when an occupant or an object touches window 20C1, the occupant or the object does not touch optical coupler 106. Therefore, damage to optical coupler 106 due to contact with optical coupler 106 is suppressed.

(Modification 2)

Figure 6:
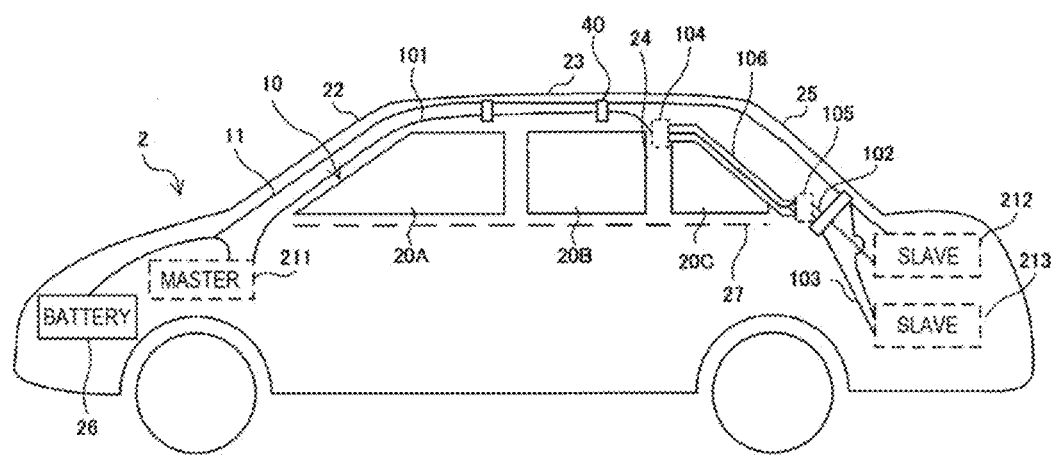
FIG. 6 is a diagram illustrating an example of a configuration of a vehicle wiring system according to a second modification of the first embodiment of the present disclosure.

FIG. 6 is a diagram illustrating an example of a configuration of a vehicle wiring system according to a second modification of the first embodiment of the present disclosure.

Referring to FIG. 6, optical coupler 106 is disposed along at least a portion of a frame (outer periphery) of window 20C of vehicle 2. More specifically, optical coupler 106 extends rearward in the front-rear direction of vehicle 2 from optical connector 104, and is bent just before D-pillar 25 so as to extend along D-pillar 25. Optical coupler 106 extending along D-pillar 25 is bent in the front-rear direction of vehicle 2 just before a beltline 27 of vehicle 2 and is connected to optical connector 105. That is, optical coupler 106 is disposed so as to pass through a portion along roof side rail 23 and a portion along D-pillar 25 in the frame of window 20C.

In this case, optical connector 104 is disposed at a relatively high position, that is, in a vicinity of roof side rail 23 in C-pillar 24. On the other hand, optical connector 105 is disposed at a relatively low position, that is, in a vicinity of beltline 27 in D-pillar 25. As described above, in a side view of vehicle 2, optical connector 105 is disposed below optical connector 104 and is disposed at a position closer to slave functional units 212 and 213.

With this configuration, a distance between optical connector 105 and slave functional units 212 and 213 becomes short, it is possible to shorten wiring sections of optical fiber cables 102 and 103 that connect optical connector 105 and slave functional units 212 and 213 to each other, thereby saving wires.

In addition, it is not necessary to pass optical fiber cables 102 and 103 through the entire region of D-pillar 25 or most of the region, thereby making D-pillar 25 thinner and vehicle 2 lighter.

Furthermore, disposing optical coupler 106 along the frame of window 20C allows a field of view of the central portion of window 20C to be secured, and a decrease in the field of view of window 20C due to optical coupler 106 to be minimized. However, optical coupler 106 may be disposed so as to pass through the central portion of window 20C.

Second Embodiment

Figure 7:
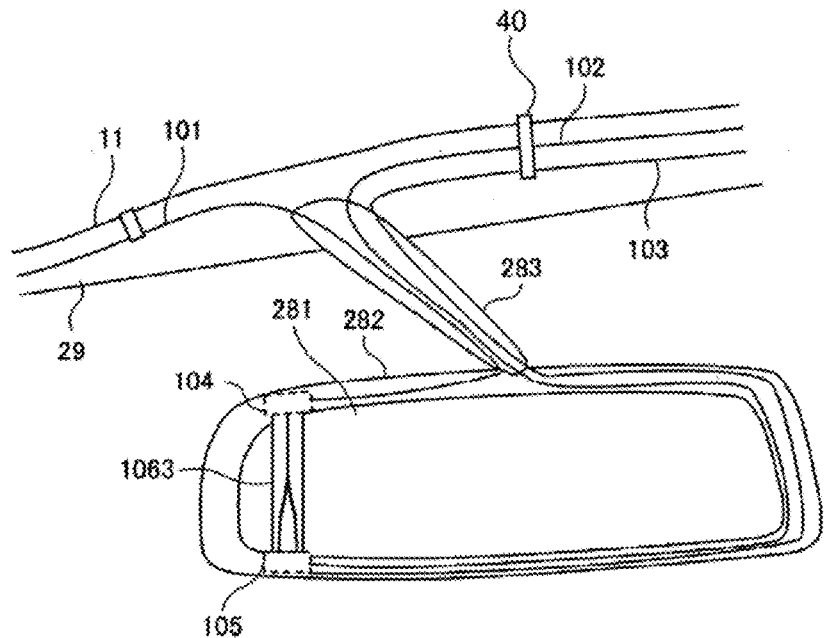
FIG. 7 is a diagram illustrating an example of a configuration of a vehicle wiring system according to a second embodiment of the present disclosure.

FIG. 7 is a diagram illustrating an example of a configuration of a vehicle wiring system according to a second embodiment of the present disclosure. The vehicle wiring system according to the second embodiment is different from that of the first embodiment in that optical coupler 106 is disposed on a mirror of vehicle 2. The vehicle wiring system according to the second embodiment is the same as vehicle wiring system 1 according to the first embodiment except for the contents described below.

In an example shown in FIG. 7, optical coupler 106 is disposed on a room mirror 281. Optical coupler 106 is disposed on a left side of the center of room mirror 281 in a left-right direction. Further, optical coupler 106 may be disposed near a left end of room mirror 281. However, optical coupler 106 may be disposed on a right side of the center of room mirror 281 in the left-right direction. Optical coupler 106 is disposed so as to connect an upper portion and a lower portion of a frame 282 of room mirror 281. Since an electric wire harness has a certain thickness, it is difficult to wire the electric wire harness on the mirror of the vehicle.

Optical connector 104 is disposed in the upper portion of frame 282. Optical connector 105 is disposed in the lower portion of frame 282. Optical connectors 104 and 105 are fixed to each position of frame 282 with, for example, a glue, a pressure-sensitive adhesive or the like.

In FIG. 7, the master functional unit and the slave functional units are not shown. The master functional unit is disposed on the floor of the vehicle, for example, and the two slave functional units are each disposed in a bonnet and a roof 29 of the vehicle.

The master functional unit may be, for example, an ECU for advanced driver assistance systems (ADAS), and the two slave functional units may be a sensor and a roof antenna module.

Optical fiber cable 101 passes from the master functional unit through the A-pillar (not shown), roof 29, a room mirror stay 283, and the upper portion of frame 282 to be connected to optical connector 104. Optical fiber cable 102 passes from the slave functional unit disposed in the bonnet through the A-pillar, roof 29, room mirror stay 283, and the upper, right, and lower portions of frame 282 to be connected to optical connector 105. Optical fiber cable 103 passes through the slave functional unit disposed in roof 29, room mirror stay 283, and the upper, right, and lower portions of frame 282 to be connected to optical connector 105.

Electric wire harness 11 connects a battery to the slave functional unit disposed in roof 29. Electric wire harness 11 extends from the battery along the A-pillar and is wired to roof 29.

Electric wire harness 11 is provided, in roof 29, together with optical fiber cables 101, 102 and 103 in a state of being integrated with optical fiber cables 101, 102 and 103. On the other hand, electric wire harness 11 is not provided together with optical coupler 106 in a state of being integrated with optical coupler 106.

More specifically, electric wire harness 11 is wired from the A-pillar to roof 29 in a state of being bundled with optical fiber cable 101. Electric wire harness 11 is separated from optical fiber cable 101 just before room mirror stay 283. Electric wire harness 11 is merged and bundled with optical fiber cables 102 and 103 wired from room mirror stay 283 to roof 29. That is, in room mirror stay 283 and frame 282, electric wire harness 11 is not wired, and only an optical transmission line is wired.

With this configuration, optical coupler 106 can be disposed on room mirror 281 which is a component of vehicle 2. This configuration eliminates a need to separately provide a space for disposing optical coupler 106, thereby making the vehicle wiring system space-saving.

(Modification)

Figure 8:
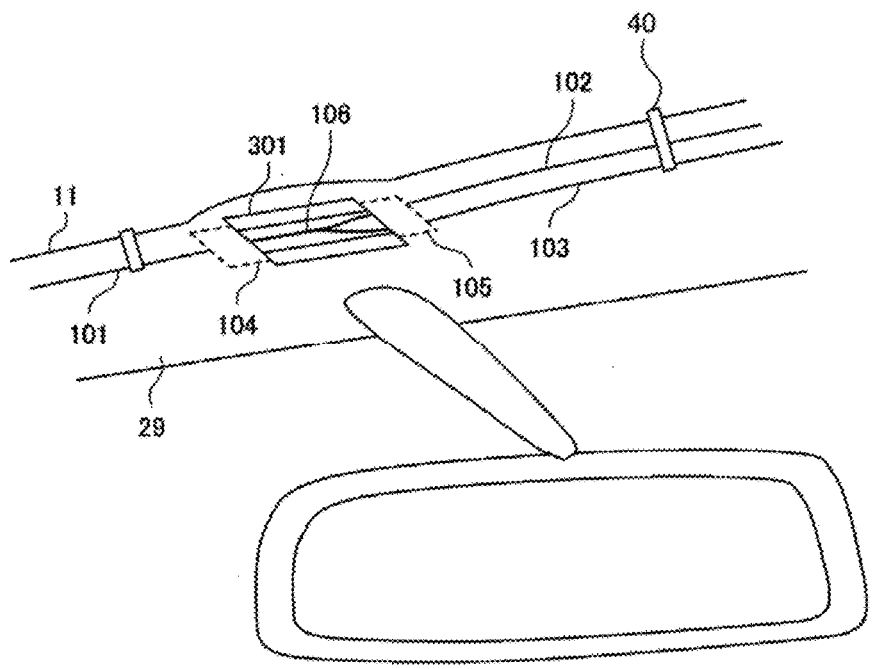
FIG. 8 is a diagram illustrating an example of a configuration of the vehicle wiring system according to a modification of the second embodiment of the present disclosure.

FIG. 8 is a diagram illustrating an example of a configuration of a vehicle wiring system according to a modification of the second embodiment of the present disclosure.

Referring to FIG. 8, optical coupler 106 is disposed, for example, on a lighting device 30 in a cockpit of vehicle 2. In an example shown in FIG. 8, optical coupler 106 is disposed on an interior lamp 301 as lighting device 30. Optical coupler 106 is disposed so as to cross interior lamp 301 in a left-right direction of vehicle 2. Optical coupler 106 is fixed to a cover (lamp cover), which is not shown, of interior lamp 301 with a glue, a pressure-sensitive adhesive, or the like. Since an electric wire harness has a certain thickness, it is difficult to wire the electric wire harness to the lighting device of the vehicle.

Optical connectors 104 and 105 are fixed to, for example, a housing to which interior lamp 301 is attached with a glue, a pressure-sensitive adhesive, or the like.

Electric wire harness 11 is provided together with optical fiber cables 101, 102 and 103 in roof 29. On the other hand, electric wire harness 11 is not provided together with optical coupler 106.

More specifically, electric wire harness 11 is wired from an A-pillar to roof 29 in a state of being bundled with optical fiber cable 101. Electric wire harness 11 is separated from optical fiber cable 101 just before interior lamp 301. Electric wire harness 11 is wired so as to bypass interior lamp 301. Electric wire harness 11 is merged and bundled with optical fiber cables 102 and 103 wired from interior lamp 301 to roof 29. That is, in interior lamp 301, electric wire harness 11 is not wired, and only an optical transmission line is wired.

With this configuration, optical coupler 106 can be disposed on interior lamp 301 which is a component of vehicle 2. This configuration eliminates a need to separately provide a space for disposing optical coupler 106, thereby making the vehicle wiring system space-saving. Further, when the optical coupler is disposed on the lighting device provided in the cockpit of the vehicle, the vehicle wiring system can be space-saving more efficiently. Optical coupler 106 is not limited to the configuration in which optical coupler 106 is disposed on lighting device 30 in the cockpit of vehicle 2. For example, electric wire harness 11 may be disposed inside a body of vehicle 2, such as inside roof 29 in a section where electric wire harness 11 is not provided together with optical fiber cables 101, 102 and 103.

Third Embodiment

Figure 9:
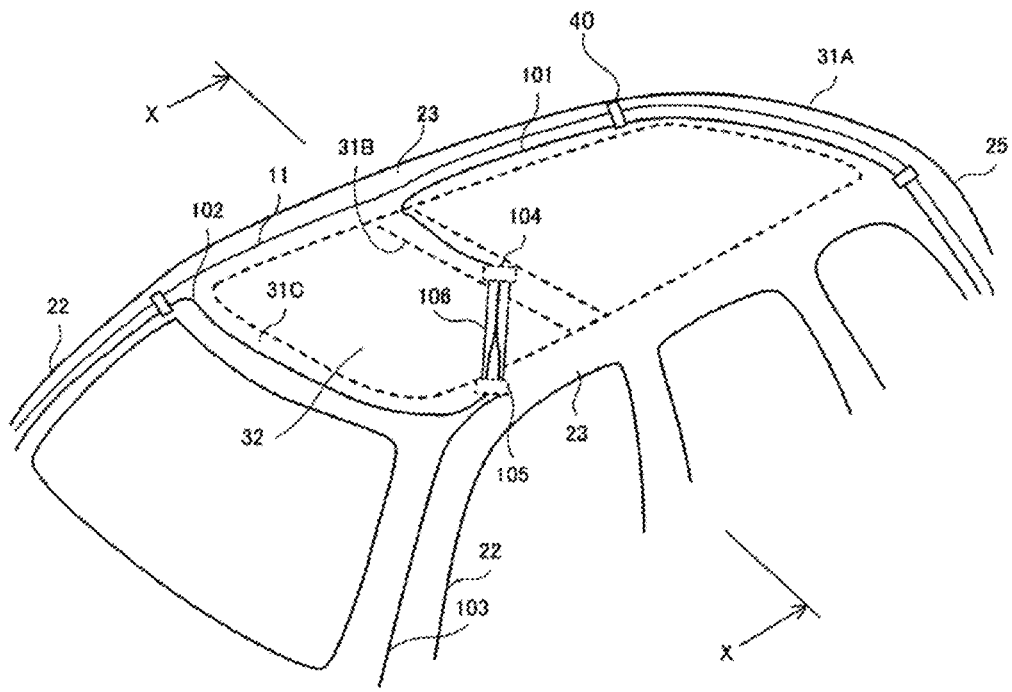
FIG. 9 is a diagram illustrating an example of a configuration of a vehicle wiring system according to a third embodiment of the present disclosure.

FIG. 9 is a diagram illustrating an example of a configuration of a vehicle wiring system according to a third embodiment of the present disclosure. The vehicle wiring system according to the third embodiment is different from that of the first embodiment in that optical coupler 106 is disposed in a roof of vehicle 2. The vehicle wiring system according to the third embodiment is the same as vehicle wiring system 1 according to the first embodiment except for the contents described below.

In FIG. 9, a master functional unit and slave functional units are not shown. FIG. 9 illustrates an example in which the master functional unit is mounted in a trunk of vehicle 2, and the two slave functional units are mounted in an engine room of vehicle 2.

Referring to FIG. 9, optical fiber cable 101 passes from the master functional unit through D-pillar 25, a rear roof cross member 31A, roof side rail 23, and a center roof cross member 31B to be connected to optical connector 104. Optical fiber cable 102 passes from the slave functional unit through A-pillar 22, a front roof cross member 31C, and roof side rail 23 to be connected to optical connector 105. Optical fiber cable 103 passes from the slave functional unit through A-pillar 22 and roof side rail 23 to be connected to optical connector 105.

Optical coupler 106 is disposed so as to connect roof side rail 23 and center roof cross member 31B to each other in vehicle 2. Optical coupler 106 passes through an opening 32 formed by roof side rail 23, front roof cross member 31C, and center roof cross member 31B.

Figure 10:
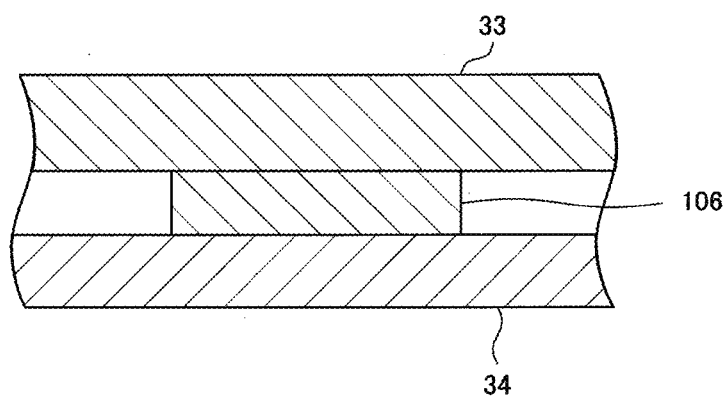
FIG. 10 is a cross-sectional view taken along line X-X in FIG. 9.

FIG. 10 is a cross-sectional view taken along line X-X in FIG. 9. Referring to FIG. 10, optical coupler 106 is disposed between a roof panel 33 and a roof lining 34 in vehicle 2. Roof panel 33 is an exterior component that is formed of, for example, a steel plate and constitutes a ceiling portion of vehicle 2. Roof lining 34 is a sheet-like interior component made of, for example, cloth, leather, chemical fiber or the like. The roof lining is attached to a surface on the vehicle interior side of roof panel 33, and forms the ceiling portion in a cabin of vehicle 2. Optical coupler 106 may be fixed to roof panel 33 with a glue, a pressure-sensitive adhesive, or the like, or may be fixed to roof lining 34. Referring to FIG. 9, optical connector 104 is disposed on center roof cross member 31B. Optical connector 105 is disposed on roof side rail 23. Optical connectors 104 and 105 are fixed to center roof cross member 31B and roof side rail 23, respectively, with a glue, a pressure-sensitive adhesive, or the like, for example.

Electric wire harness 11 connects a battery to slave functional units disposed in the engine room. Electric wire harness 11 connects the battery to the master functional unit disposed in the trunk. Electric wire harness 11 extends from the battery along A-pillar 22, roof side rail 23, rear roof cross member 31A, and D-pillar 25.

Electric wire harness 11 is provided together with optical fiber cable 102 in A-pillar 22. Electric wire harness 11 is provided together with optical fiber cable 101 in a partial section of roof side rail 23, rear roof cross member 31A, and D-pillar 25. On the other hand, electric wire harness 11 does not pass through opening 32, and is not provided together with optical coupler 106.

When a thick object such as electric wire harness 11 is disposed between roof panel 33 and roof lining 34, it is necessary to design a thickness, shape, and the like of a roof component such as roof panel 33 in consideration of electric wire harness 11. However, since optical coupler 106 is as thin as 1 mm or less, even when optical coupler 106 is inserted between roof panel 33 and roof lining 34, it is difficult to affect the design of the roof component. Therefore, it is possible to effectively utilize a space in which the electric wire harness is not disposed while maintaining a degree of freedom in the roof design.

In the above embodiment, a case where optical coupler 106 is disposed on or in window 20C, room mirror 281, interior lamp 301, and roof 29 of vehicle 2 in the vehicle wiring system has been described. However, the vehicle wiring system of the present disclosure is not limited thereto. Optical coupler 106 may be disposed in a portion of vehicle 2 where electric wire harness 11 is not wired.

The vehicle wiring system according to the above embodiment may be constructed by a method that includes preparing a plurality of functional units 21 to be mounted in vehicle 2, optical transmission line 10, electric wire harness 11, and optical coupler 106; wiring optical transmission line 10 between functional units 21 so as to transmit an optical signal of functional units 21; wiring electric wire harness 11 in a partial section of optical transmission line 10 so that electric wire harness 11 is provided together with optical transmission line 10 in a state of being integrated with optical transmission line 10; and disposing optical coupler 106 in a portion of optical transmission line 10 other than the partial section and causing optical coupler 106 to constitute a part of optical transmission line 10.

The above-described embodiments are to be considered in all respects as illustrative and not restrictive. The scope of the present invention is defined not by the above description but by the claims, and is intended to embrace all the modifications within the meaning and scope of equivalency of the claims.

The above description includes features that are appended below.

[Supplementary Note 1]

A vehicle wiring system includes an optical transmission line that is configured to transmit an optical signal between functional units to be mounted in a vehicle and an electric wire harness that is provided, in a partial section of the optical transmission line, together with the optical transmission line. The optical transmission line has an optical coupler that is disposed in a portion of the optical transmission line where the electric wire harness and the optical transmission line are not provided together. The optical coupler includes a body portion formed of a resin and an optical waveguide formed in the body portion and having a branching portion.

[Supplementary Note 2]

A vehicle wiring system includes an optical transmission line that is configured to transmit an optical signal between functional units to be mounted in a vehicle and an electric wire harness that is provided, in a partial section of the optical transmission line, together with the optical transmission line. The optical transmission line has an optical coupler that is disposed in a portion of the optical transmission line where the electric wire harness and the optical transmission line are not provided together. The functional units are at least one of an ECU, a sensor, or an antenna module.

REFERENCE SIGNS LIST 1 vehicle wiring system
10 optical transmission line
101, 102, 103 optical fiber cable
101A tension member
101B optical fiber
101C protective layer
101D wrapping tape
101E sheath
104, 105 optical connector
106 optical coupler
106A body portion
106B optical waveguide
106C first end
106D second end
106E third end
1 electric wire harness
2 vehicle
20A, 20B, 20C, 20C1 window
20C2 sheet glass
20C3 interlayer
21 functional unit
211 master functional unit
212, 213 slave functional unit
22 A-pillar
23 roof side rail
24 C-pillar
25 D-pillar
26 battery
27 beltline
28 mirror
281 room mirror
282 frame
283 room mirror stay
29 roof
30 lighting device
301 interior lamp
31A rear roof cross member
31B center roof cross member
31C front roof cross member
32 opening
33 roof panel
34 roof lining
40 cable tie (tying member, fixing member)

The invention claimed is:

1. A vehicle wiring system comprising:
a plurality of functional circuits to be mounted in a vehicle, the plurality of functional circuits including a master functional circuit and slave functional circuits;
an optical transmission line wired between the master functional circuit and the slave functional circuits, the optical transmission line being configured to transmit an optical signal of the master functional circuit and the slave functional circuits, the optical transmission line including a plurality of optical fiber cables;
an electric wire harness provided, in a partial section of the optical transmission line, together with the optical transmission line in a state of being integrated with the optical transmission line;
an optical coupler disposed in a portion of the optical transmission line other than the partial section and constituting a part of the optical transmission line;

a first optical connector configured to receive the optical signal from one of the plurality of optical fiber cables and output the optical signal to other optical fiber cables among the plurality of optical fiber cables via the optical coupler; and a second optical connector, wherein the partial section of the optical transmission line is between the master functional circuit and the first optical connector, the optical coupler includes a body portion and an optical waveguide branching in the body portion, the first optical connector is connected to a first end of the optical waveguide, and the second optical connector is connected to a second end of the optical waveguide, the second end of the optical waveguide being opposite to the first end of the optical waveguide, the optical transmission line further includes a tension member, a plurality of optical fibers, a protective layer, a wrapping tape and a sheath, the plurality of optical fibers is disposed around the tension member, the protective layer covers the plurality of optical fibers, the wrapping tape covers the protective layer, and the sheath covers the wrapping tape.

2. The vehicle wiring system according to claim 1, wherein the vehicle wiring system includes window glass to be mounted in the vehicle, and wherein the optical coupler is disposed on or in the window glass.

3. The vehicle wiring system according to claim 2, wherein the window glass is constituted by laminated glass having a plurality of layers, and wherein the optical coupler is disposed between the layers.

4. The vehicle wiring system according to claim 2, wherein the optical coupler is disposed along an outer periphery of the window glass.

5. The vehicle wiring system according to claim 1, wherein the vehicle wiring system includes a mirror to be mounted in the vehicle, and wherein the optical coupler is disposed on the mirror.

6. The vehicle wiring system according to claim 1, wherein the vehicle wiring system includes an interior lighting device to be mounted in the vehicle, and wherein the optical coupler is disposed on the lighting device.

7. The vehicle wiring system according to claim 6, wherein the lighting device is configured to be capable of being disposed in a cockpit of the vehicle, and wherein the optical coupler is disposed on a cover of the lighting device.

8. The vehicle wiring system according to claim 1, wherein the vehicle wiring system includes a roof panel and a roof lining to be mounted in the vehicle, and wherein the optical coupler is disposed between the roof panel and the roof lining.

9. A method of constructing a vehicle wiring system, the method comprising:

preparing a plurality of functional circuits to be mounted in a vehicle, an optical transmission line, an electric wire harness, an optical coupler, a first optical connector and a second optical connector, the plurality of functional circuits including a master functional circuit and slave functional circuits;

wiring the optical transmission line between the master functional circuit and the slave functional circuits, the optical transmission line transmitting an optical signal of the master functional circuit and the slave functional circuits and the optical transmission line including a plurality of optical fiber cables;

wiring the electric wire harness in a partial section of the optical transmission line so that the electric wire harness is provided together with the optical transmission line in a state of being integrated with the optical transmission line;

disposing the first optical connector between the master functional circuit and the optical coupler, the first optical connector receiving the optical signal from one of the plurality of optical fiber cables and output the optical signal to other optical fiber cables among the plurality of optical fiber cables via the optical coupler; and disposing the optical coupler in a portion of the optical transmission line other than the partial section and causing the optical coupler to constitute a part of the optical transmission line, wherein the partial section of the optical transmission line is between the master functional circuit and the first optical connector, the optical coupler includes a body portion and an optical waveguide branching in the body portion, the method further comprises:

connecting the first optical connector to a first end of the optical waveguide; and connecting the second optical connector to a second end of the optical waveguide, the second end of the optical waveguide being opposite to the first end of the optical waveguide, the optical transmission line further includes a tension member, a plurality of optical fibers, a protective layer, a wrapping tape and a sheath, the plurality of optical fibers is disposed around the tension member, the protective layer covers the plurality of optical fibers, the wrapping tape covers the protective layer, and the sheath covers the wrapping tape.

10. The method according to claim 9, wherein the first optical connector outputs the optical signal to the slave functional circuits via the plurality of optical fiber cables.

11. The method according to claim 9, wherein the master functional circuit is configured to be mounted to an engine room of the vehicle, and the master functional circuit includes an automatic driving electronic control unit (ECU), a navigation device, a telematics control unit (TCU) and a gateway device.

12. The vehicle wiring system according to claim 1, wherein the first optical connector outputs the optical signal to the slave functional circuits via the plurality of optical fiber cables.

13. The vehicle wiring system according to claim 1, wherein the master functional circuit is configured to be mounted to an engine room of the vehicle, and the master functional circuit includes an automatic driving electronic control unit (ECU), a navigation device, a telematics control unit (TCU) and a gateway device.

* * * * *